US006988758B1

(12) United States Patent
    Talbot

(10) Patent No.: US 6,988,758 B1
(45) Date of Patent: Jan. 24, 2006

(54) BASE MOUNT

(75) Inventor: Robert A. Talbot, Holland, MA (US)

(73) Assignee: Pioneer Consolidated Corp., North Oxford, MA (US)

( * ) Notice: Subject to any disclaimer, the term of this patent is extended or adjusted under 35 U.S.C. 154(b) by 0 days.

(21) Appl. No.: 11/004,089

(22) Filed: Dec. 3, 2004

(51) Int. Cl.
    *B60P 7/04* (2006.01)
(52) U.S. Cl. .................................. 296/100.18; 296/98
(58) Field of Classification Search .................. 296/98, 296/100.14, 100.15, 100.18, 122
    See application file for complete search history.

(56) References Cited

U.S. PATENT DOCUMENTS 5,887,937 A * 3/1999 Searfoss ...................... 296/98

6,575,519 B2 * 6/2003 Henning ...................... 296/98
2003/0090124 A1 * 5/2003 Nolan et al. .................. 296/98

* cited by examiner

*Primary Examiner*—Jason Morrow

(74) *Attorney, Agent, or Firm*—Young & Basile, P.C.

(57) ABSTRACT

An apparatus mounts a covering system of a truck. The apparatus can have a stud, a lock ring, a retaining plate, and means for releasably attaching the apparatus to the truck. The stud can have a base and a shaft having an anchor for receiving a reaction end of an at least one spring. The lock ring can have a pocket having a complementary shape to the base of the shaft for adjustably rotating the stud through a three-hundred sixty degree (360°) range. The retaining plate can have an aperture for receiving the shaft. The means for releasably attaching the apparatus can include at least one fastener.

21 Claims, 5 Drawing Sheets

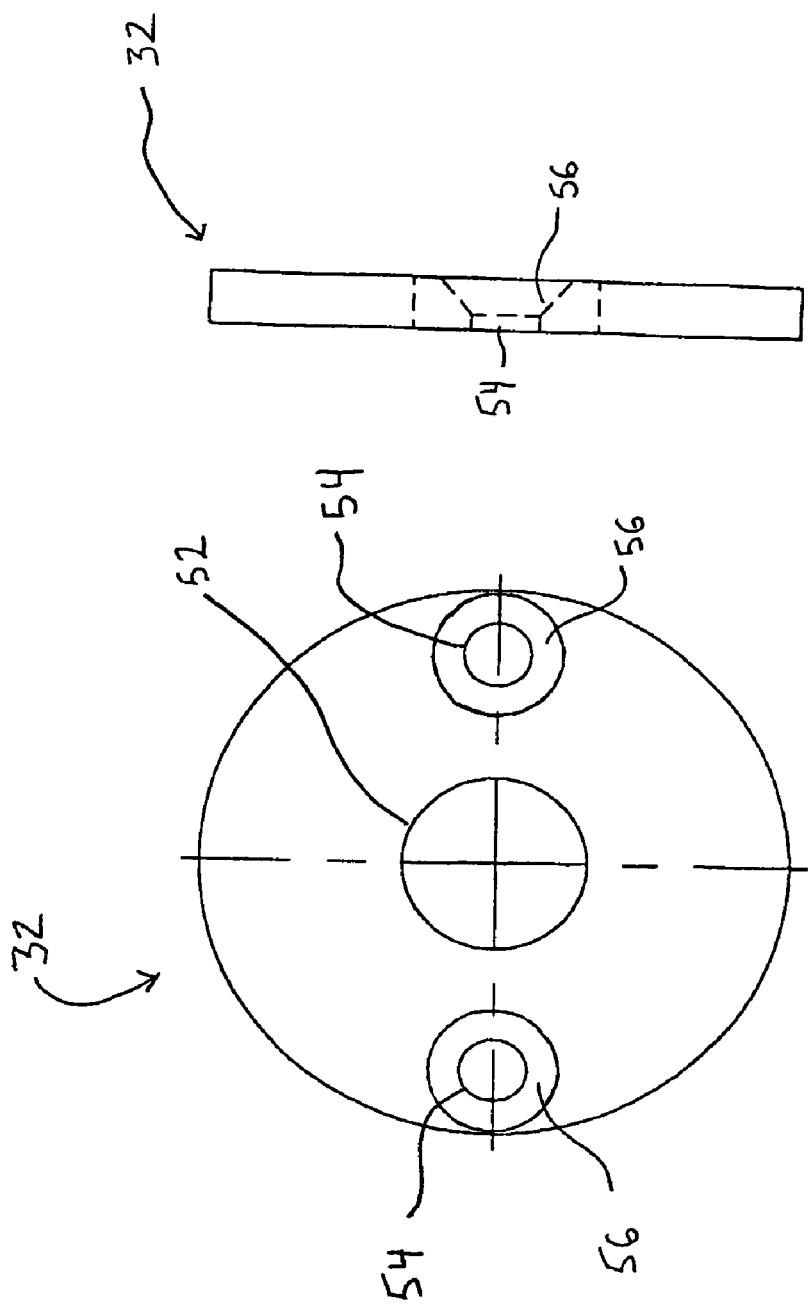

BASE MOUNT

FIELD OF THE INVENTION

The present invention relates to an apparatus for mounting a covering system for a truck.

BACKGROUND OF THE INVENTION

In the trucking industry, it is common to cover the open cargo or container area of a truck using a covering system to prevent spillage onto the roadway or to retain heat in the case of asphalt. The covering system is typically a tarping system. There are many tarping systems with a variety of deployment means. All such systems have a common spring-loaded roller that maintains tension on the tarpaulin and which stores the tarp or cover when the container is uncovered. In a typical system, the tarp is attached to the roller at one end while the other is fixed to a stationary member of the covering system. The roller is typically attached to a bail member that is rotatable relative to the container to move the tarp between covered and uncovered positions.

The typical bail member includes a pair of arms each pivotably attached at one end to the truck or to the container and attached at an opposite end to the tarp roller. The typical bail member also includes at least one spiral torsion spring that can have a reaction end anchored to a base mount on the truck or the container and can have an opposite reaction end anchored to the arm in order to exert a torsion force in the deployed direction. This force serves to aid in moving the cover to a deployed position and to prevent the cover from lifting off the container in a deployed position. In order to exert a force in the deployed direction, the spring must first be pre-loaded.

Typically, the way the spring is pre-loaded consists of turning the base mount while holding the bail arms stationary. When the required amount of pre-load has been accomplished, the mount is attached to the container. The typical base mount has a single set of mounting holes that only allow the mount to be attached to the container in one position. In order to adjust the pre-load on the spring it is typically necessary to drill additional holes either in the mount or the container, or to weld the mount to the container without using the mounting holes.

U.S. Pat. No. 6,575,519, issued to Henning, discloses an actuation mechanism for a tarping system. The '519 patent includes a shaft bracket mountable to a side of a truck and including a mounting plate and a shaft. The shaft defines an anchor slot extending along a substantial portion of the length of the shaft in order to anchor a center portion of a double coil spiral spring. Also, the shaft is pivotally attachable to a bail member of a covering system. The mounting plate includes an array of three pairs of mounting holes with a hole in each pair being located opposite to the other hole in the pair relative to the shaft. The three pairs of mounting holes allow the shaft bracket to be attached to the truck and allows for a limited number and range of different angular orientations of the anchor slot relative to the truck.

SUMMARY OF THE INVENTION

In accordance with the present invention, an apparatus for mounting a covering system of a truck is disclosed. The apparatus preferably includes a stud including a base and a shaft having an anchor for receiving a reaction end of at least one spring, a lock ring including a pocket having a complementary shape to the base of the shaft for adjustably rotating the shaft through a three-hundred sixty degree (360°) range, a retaining plate including an aperture for receiving the shaft, and means for releasably attaching the apparatus to the truck.

The anchor can include a longitudinal slot in the shaft. By way of example and not limitation, the slot has at least one chamfered edge. In another embodiment, the shaft includes a circumferential groove for receiving a retainer of a housing. The base of the stud and the pocket of the lock ring can have any desired shape, such as a polygon, a hexagon, an octagon, a splined circle, a toothed circle, etc.

The lock ring can include at least one aperture for receiving the means for attaching. Similarly, the retaining plate can include at least one aperture for receiving the means for attaching. By way of example and not limitation, the at least one aperture of the retaining plate includes a chamfered edge for countersinking a head of the means for attaching.

The means for attaching preferably includes at least one fastener in the form of a screw and/or a bolt.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 7 is a front plan view of a retaining plate of the base mount; and

FIG. 8 is a side elevational view of the retaining plate.

DESCRIPTION OF THE PREFERRED EMBODIMENT

Figure 1:
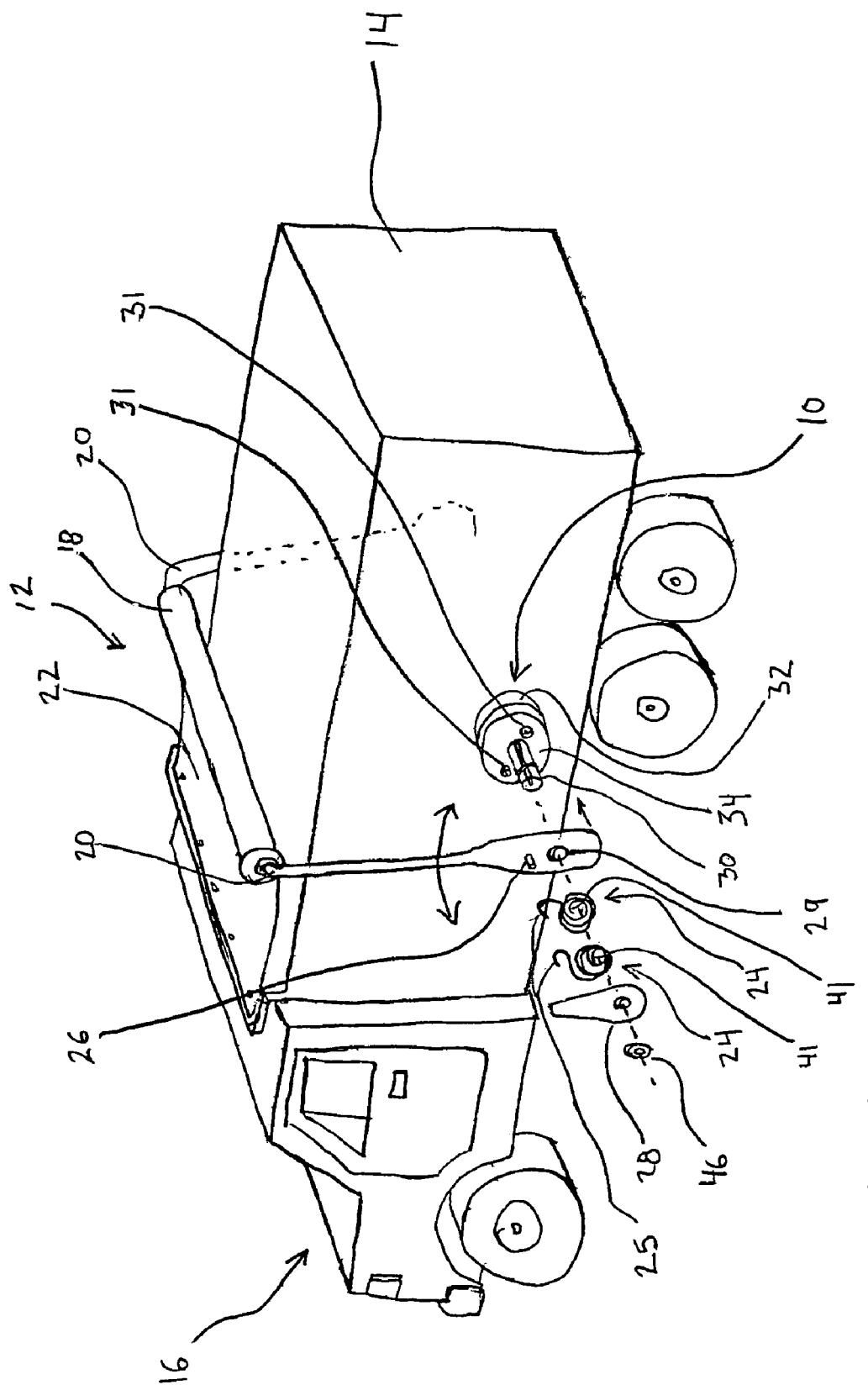
FIG. 1 is a simplified partially-exploded side perspective view of a truck showing a covering system including a base mount according to the present invention.
Figure 2:
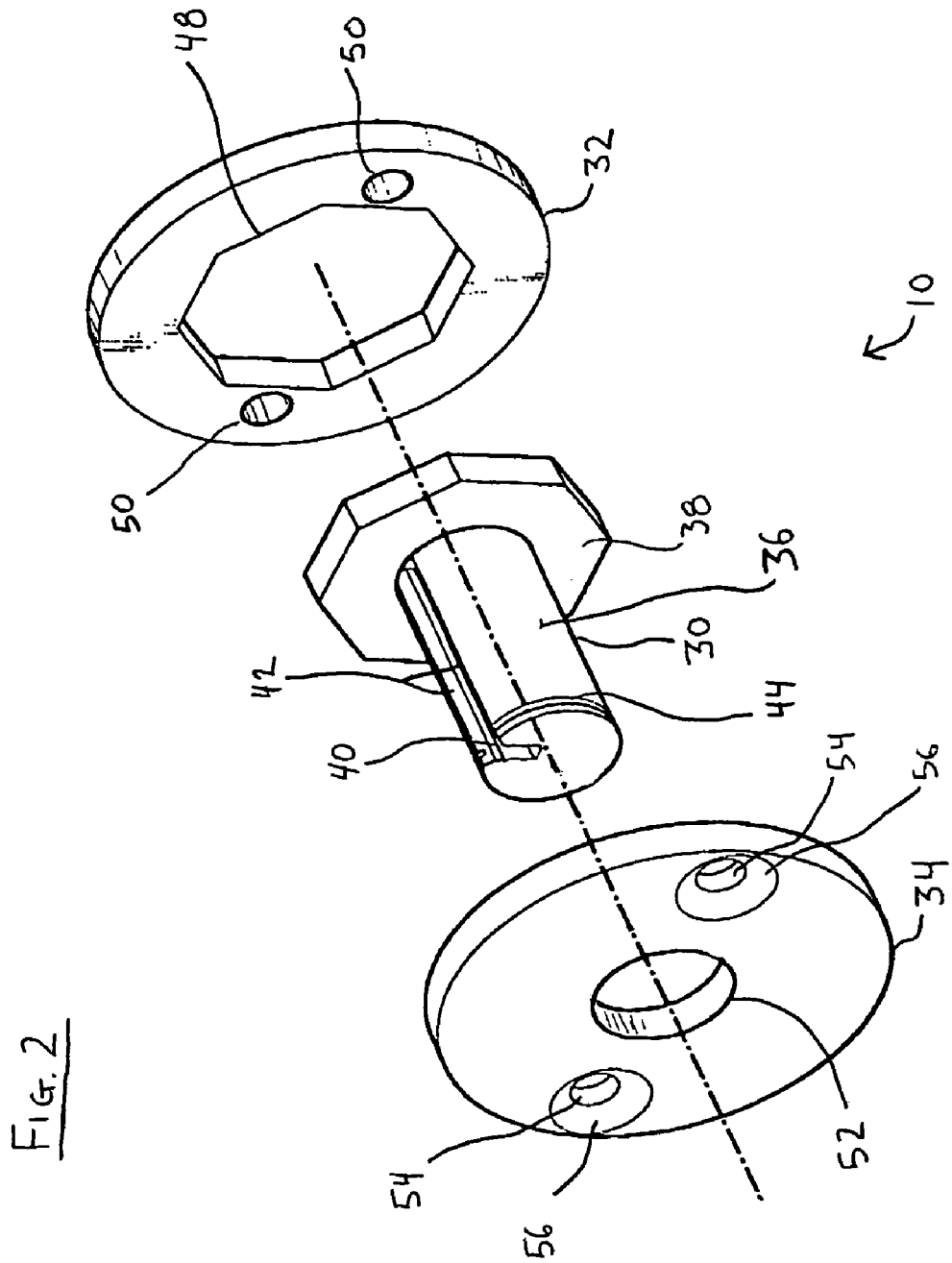
FIG. 2 is a simplified exploded side perspective view of the base mount of FIG. 1.
Figure 3:
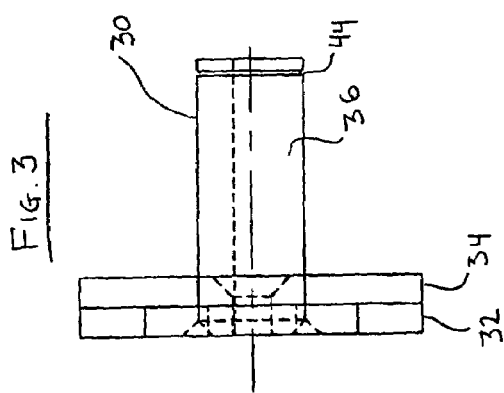
FIG. 3 is a simplified side elevational view of the base mount of FIG. 1.

Referring to FIG. 1, a base mount 10 for a covering system 12 of a container 14 is disclosed. Typically, the container 14 is carried on the back of a truck 16. As shown, a roller 18 is mounted between two pivoting arms 20 of the covering system 12. Each of the arms 20 can be pivotably attached to the base mount 10 that is attached to a side of the truck 16. One end of a cover 22 is fixed to the roller 18, and the other end can be fixed to the truck 16. By way of example and not limitation, the cover 22 can be of a tarpaulin type. As the arms 20 pivot back and forth, the cover 22 rolls onto or unrolls from the roller 18. The arms 20 typically include at least one torsion spring 24, a reaction post 26 for anchoring a first reaction end 25 of each spring 24 and a housing 28. Each arm 20 can include an aperture 29 for receiving a stud 30 of the base mount 10 for pivotably attaching the arm 20. The base mount 10 includes means for attaching the base mount 10 to the truck 16. By way of example and not limitation, the means for attaching includes at least one fastener 31, which can be a screw, and/or a bolt, and/or a nut fastened to a corresponding threaded projection that is fixedly attached to the side of the truck 16. As shown in FIGS. 1–3, the base mount 10 can include the stud 30, a lock ring 32, and a retaining plate 34.

Figure 5:
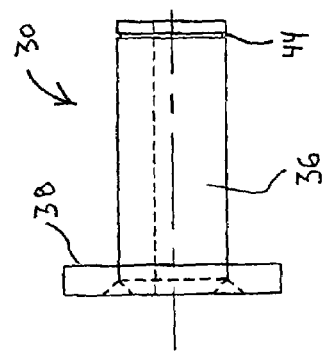
FIG. 5 is a side elevational view of the stud of FIG. 4.
Figure 4:
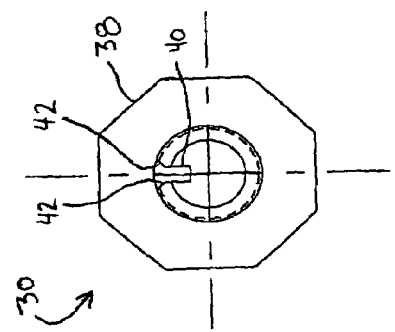
FIG. 4 is a front plan view of a shaft of the base mount.
Figure 4A:
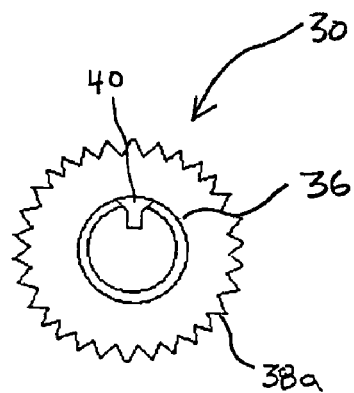
FIG. 4A is a front plan view of the stud showing the stud having a splined base.
Figure 4B:
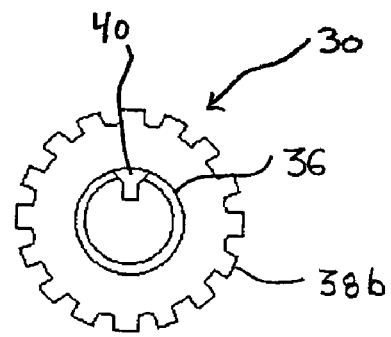
FIG. 4B is a front plan view of the stud showing the stud having a toothed base.

Referring now to FIGS. 2, 4, and 5, the stud 30 includes a shaft 36 and a base 38. The base 38 is preferably integral with the stud 30. The base 38 has a polygonal shape, a hexagonal shape, a decahedronal shape, or an octagonal shape as shown in FIG. 4, a splined shape base 38a as shown in FIG. 4A, or a toothed shape base 38b as shown in FIG. 4B. Of course, other shapes are possible as described further in detail below. Returning to FIGS. 2, 4, and 5, the shaft 36 includes a longitudinal keyway or slot 40. The slot 40 serves as an anchor for a second reaction end 41 (shown in FIG. 1) of the spring(s) 24 where the reaction post 26 of the arm 20 acts as an anchor for the first reaction end 25 of each spring 24. By rotating the stud 30 within the locking ring 32 as described below, the angular relationship between the slot 40 and the post 26 can be adjusted to vary a pre-load applied to each spring 24. The slot 40 can optionally include at least one chamfered edge 42 to assist in anchoring the second reaction end 41 of each spring 24. As shown in FIGS. 3 and 5, the shaft 36 includes a circumferential groove 44 for securing a fastener and/or retainer 46 (shown in FIG. 1) of the housing 28.

Figure 6:
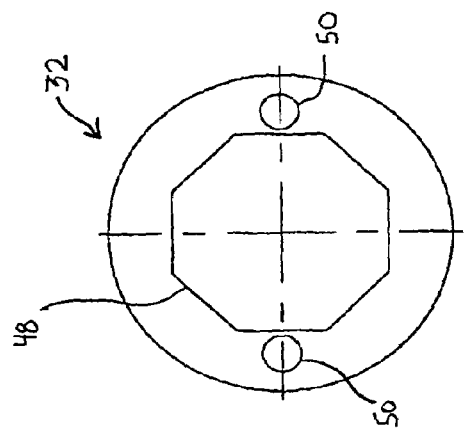
FIG. 6 is a front plan view of a locking ring of the base mount.
Figure 6A:
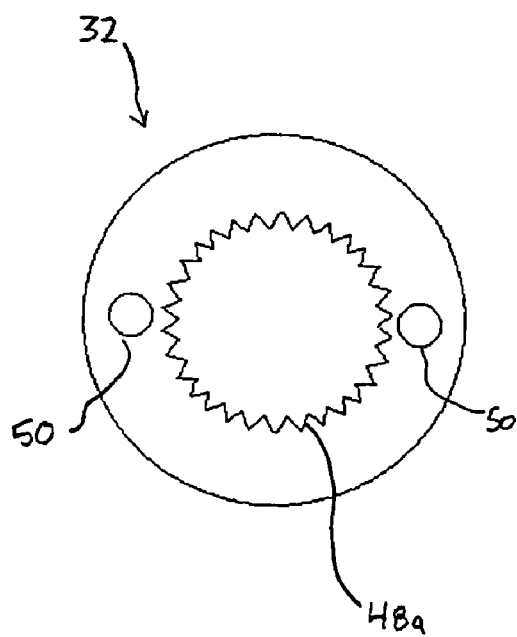
FIG. 6A is a front plan view of the locking ring of the base mount showing the locking ring having a splined pocket.
Figure 6B:
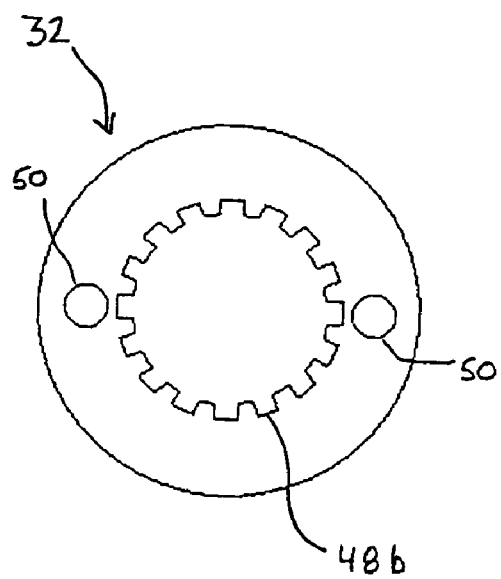
FIG. 6B is a front plan view of the locking ring of the base mount showing the locking ring having a toothed pocket.

Referring now to FIGS. 2 and 6, the lock ring 32 includes a pocket 48 and at least one aperture 50. By way of example and not limitation, the lock ring 32 can be generally circular in shape. The pocket 48 preferably has a complementary shape to the base 38 of the stud 30 in order to allow an exterior surface of the base 38 to engage an interior surface at the lock ring 32 and to allow the slot 40 to be fixedly adjustable through a three-hundred sixty degree (360°) range in order to adjust a preload of the spring(s) 24. For example, the pocket 48 can have a polygonal shape, a hexagonal shape, an octagonal shape as shown in FIG. 6, a splined circular shape pocket 48a as shown in FIG. 6A, or a toothed circular shape 48b as shown in FIG. 6B, which correspond to the shapes of the base 38, 38a, and 38b shown in FIGS. 4, 4A, and 4B, respectively. The only requirement of shapes is that the stud 30 is fixed when the base 38 is engaged with the pocket 48.

The retaining plate 34 includes a shaft aperture 52 and at least one aperture 54 as shown in FIGS. 2, 7, and 8. The retaining plate 34 can be generally circular in shape to conform to the shape of the lock ring 32. Each aperture 54 preferably includes a chamfered edge 56 for countersinking a head of each fastener 31. Each aperture 54 of the retaining plate 34 is aligned with respective apertures 50 of the lock ring 32 in order to receive the fasteners 31 to secure the retaining plate 34 to the lock ring 32 and to attach the base mount 10 to the truck 16 as shown in FIGS. 1 and 2.

To install the base/mount 10 to the truck 16, the stud 30 is rotated to achieve a desired angular orientation of the slot 40 relative to the reaction post 26 to adjust the pre-load at the spring(s) 24, the base 38 of the stud 30 is engaged with the pocket 48 of the lock ring 32, the retaining plate 34 is assembled to the lock ring 32 and the shaft 30 such that the shaft 30 is received by the shaft aperture 52 and the aperture(s) 54 of the retaining plate 34 are aligned with the equal number of apertures 50 of the lock ring 32, and then each fastener 31 is inserted through each aligned set of apertures 54, 50 to attach the base mount 10 to the truck 16. Additionally, the above installation can be performed where the lock ring 32 is fixedly attached to the truck 16 using, by way of example and not limitation, welding.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An apparatus for mounting a covering system of a truck, the covering system including a cover and at least one arm, comprising:
   a lock ring mountable to a side of the truck, the lock ring including a pocket;
   a stud having a base and a shaft having a slot, wherein the base is complementary-shaped to the pocket so that the stud may be adjustably rotatable within the pocket, wherein the shaft is connectable to the arm, and wherein a spring may be received in the slot; and
   a retaining plate connectable to the lock ring to prevent movement of the stud with respect to the lock ring, the retaining plate including an aperture through which the shaft can project.

2. The apparatus of claim 1 wherein the lock ring, the stud, and the retaining plate are formed of a metal material.

3. The apparatus of claim 1 wherein the stud, the lock ring, and the retaining plate formed of a coated material.

4. The apparatus of claim 1 wherein the lock ring includes at least one aperture for receiving means for attaching the apparatus to the truck.

5. The apparatus of claim 1 wherein the lock ring is fixedly attached to the truck.

6. The apparatus of claim 1 wherein the slot is a longitudinal slot in the shaft.

7. The apparatus of claim 6 wherein the slot further comprises at least one chamfered edge.

8. The apparatus of claim 1 wherein the stud further comprises a circumferential groove positioned proximate to an end of the shaft opposite to the base for receiving at least one of a retainer and a fastener connectible to secure a housing.

9. The apparatus of claim 1 wherein the base of the stud is an integral base.

10. The apparatus of claim 1 wherein the base of the stud has a polygonal shape.

11. The apparatus of claim 10 wherein the polygonal shape is one of a hexagon, an octagon, and a decahedron.

12. The apparatus of claim 1 wherein the base of the stud has one of a splined circle shape, and a toothed circle shape.

13. The apparatus of claim 1 wherein the retaining plate includes at least one aperture for receiving means for attaching the apparatus to the truck.

14. The apparatus of claim 13 wherein the aperture further comprises a chamfered edge for countersinking a head of the means for attaching.

15. The apparatus of claim 13 wherein the means for attaching further comprise at least one fastener.

16. The apparatus of claim 15 wherein the at least one fastener further comprises at least one of a screw, a bolt, and an assembly of a nut and a threaded projection.

17. An apparatus for mounting a covering system of a truck, the covering system having torsion spring loaded arms, the arms including a housing containing at least one torsion spring and having a post to anchor an end of the at least one spring, the apparatus comprising:

a stud including a base and a shaft having an anchor for receiving an opposite end of the at least one spring; and means for rotatably adjusting the stud through a three-hundred sixty degree (360°) range; and means for releasably attaching the apparatus to the truck.

18. The apparatus of claim 17, wherein the means for rotatably adjusting the stud further comprise:

a lock ring including a pocket having a complementary shape to the base of the stud for adjustably rotating the stud through the three-hundred sixty degree (360°) range and including at least one aperture for receiving the means for releasably attaching; and a retaining plate for capturing the base of the stud into the lock ring and including an aperture through which the shaft can project and including at least one aperture for receiving the means for releasably attaching.

19. The apparatus of claim 18, wherein the at least one aperture of the retaining plate further comprises a chamfered edge for countersinking a head of the means for releasably attaching.

20. The apparatus of claim 19, wherein the means for releasably attaching further comprises at least one fastener.

21. The apparatus of claim 20, wherein the at least one fastener further comprises a screw.

* * * * *